April 9, 1957     A. P. BAY     2,787,859

FISHING LURES

Filed April 29, 1955

INVENTOR.
Alfred P. Bay
BY
Singer, Stern & Carlberg
Attorneys

United States Patent Office 2,787,859
Patented Apr. 9, 1957

2,787,859

FISHING LURES

Alfred Paul Bay, Topeka, Kans., assignor of one-half to Paul Edward Feldman, Topeka, Kans.

Application April 29, 1955, Serial No. 504,778

5 Claims. (Cl. 43—42.28)

The invention relates to improvements in weedless fishing lures adapted for casting either with a conventional casting rod and deep water fishing or with a fly rod when the weedless fishing lure is made of small size and light weight so as to be seized by the fish swimming near the surface of the water and when jumping out of the water.

It is a principal object of the invention to provide a body resembling in shape the head of a minnow and attaching to the neck portion of the head of relatively stiff weed guard wire of conventional shape and also one end of a flexible shaft to the other end of which is fixedly attached a stiff fish hook which comes to lie completely within the outer curved end portion of the weed guard.

It is a very important object of the invention that the flexible shaft on which the fish hook is attached has a greater flexibility than the relatively stiff weed guard. The relatively stiff weed guard makes the fishing lure substantially weedless, while the much more flexible shaft carrying the hook makes it easy for a fish to close its jaws about the hook without much resistance offered by the hook, but thereafter insures a secure setting of the hook in the mouth or even throat of the fish.

Still another object of the invention is to provide the fishing lure so far described with a spoon which is pivotally attached to the free end of the weed guard wire, and to cover the weed guard wire, the flexible shaft and the fish hook attached to the latter with a buck tail or a skirt composed of deer hair or the like, so that only the spoon is exposed, the fishing line as a whole having the appearance and action when pulled through the water, of a live minnow.

These and other objects of the invention will be better understood when the following description is read in connection with the accompanying drawing illustrating a preferred embodiment of the invention.

Figure 1:
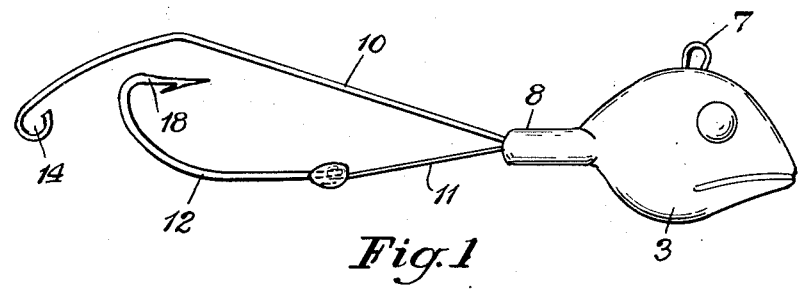
Fig. 1 is a side elevation illustrating the principal feature of the invention, namely, the relation between the body, the weed guard and the flexible shaft with the rigid hook thereon, the bucktail and spoon being omitted.
Figure 2:
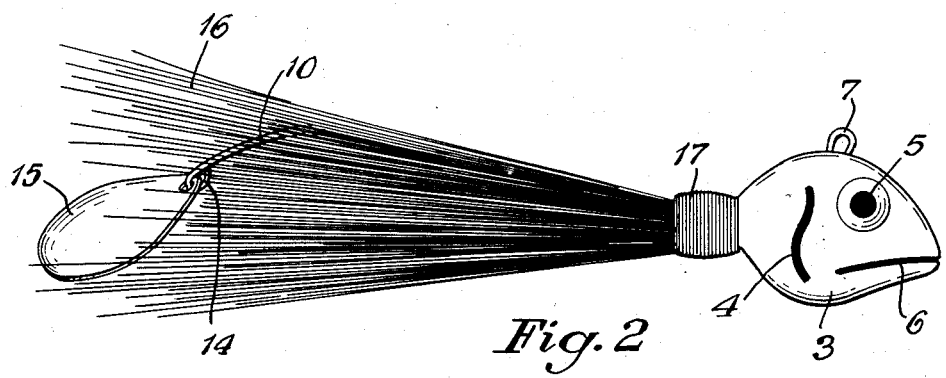
Fig. 2 illustrates a side elevational view of a complete weedless fishing lure of the present invention.
Figure 3:
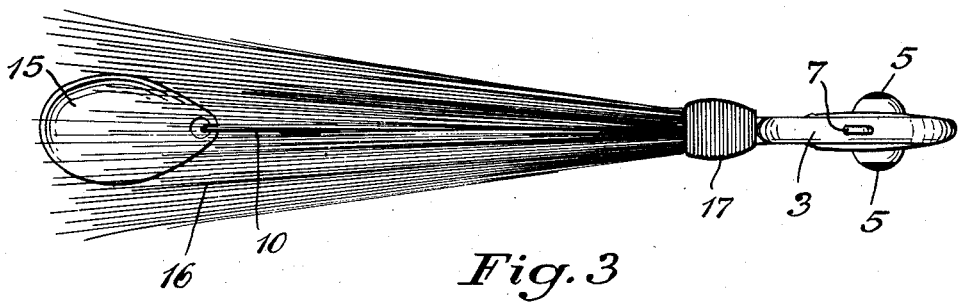
Fig. 3 is a top plan view of the complete fishing lure.

Referring to the drawing, the fishing lure is provided with a body 3 resembling the head of a minnow provided with eyes 5 protruding somewhat from the flat side faces of the head and having gill covers 4 and lips 6 produced in relief. The head 3 may be painted with waterproof lacquer in a variety of colors. From the top of the head 3 projects the loop portion 7 of a piece of stainless-steel or other rustproof wire, the ends of which are securely embedded or anchored in the head 3, which latter consists preferably of lead when the lure is used for deep water fishing. In a fly fishing lure, the head 3 is made usually much smaller and of a material which floats, such as wood, cork, a piece of hollow plastic or the like.

The loop portion 7 serves for the purpose of attaching thereto the fishing line, preferably by means of a conventional leader.

The head 3 is formed integrally with a substantially cylindrical neck portion 8 within which are securely anchored one end of a relatively stiff weed guard wire 10 and one end of a relatively more flexible shaft 11 on the other end of which is fixedly attached a conventional fish hook 12 in such manner that the rigid shaft of the fish hook 12 forms an extension or continuation of the flexible shaft 11. The hook portion 18 of the fish hook is arranged within the area surrounded substantially by the outer curved end portion of the relatively stiff weed guard wire 10, the free end of which is formed into an eye 14 to which is loosely and pivotally attached a shiny spoon 15 of any desired shape as long as the spoon is moved quickly in an oscillating motion when the lure is pulled through the water or caused to move through the air just above the surface of the water, as the case may be.

In view of the greater flexibility of the shaft 11, as compared with the flexibility of the weed guard wire 10, a fish seizing the hook 12 will deflect the same toward the weed guard wire, with the result that the fishing lure, once it has been seized, will quickly set in the mouth or throat of the fish before the latter has become aware of it.

Finally, there is secured to the cylindrical neck portion 8, a skirt arrangement 16 consisting of a buck tail made of deer-hair or the like, dyed in various colors. These hairs are attached to the neck portion by waterproof cement and also by a thread 17 tightly wound about the hairs and saturated with waterproof cement. The hairs are sufficiently long to cover entirely the weed guard wire 10, the flexible shaft 11 and the stiff fishing hook. Solely the shiny spoon 15 is permitted to extend outwardly from the rear end of the skirt 16.

The completed fishing lure, when pulled through the water, has the appearance of a live minnow and by proper handling, can run deep in the water when made of heavy material such as lead, and is therefore able to attract game fish quickly and with good results. The flexible shaft on which the rigid fish hook is attached permits the hook to be moved only by the jaw of a biting fish in such manner that the fish will hardly notice it until the point of the hook projects beyond the weed guard and will enter the tissues in the mouth of the fish.

What I claim as my invention is:

1. In a weedless fishing lure, a body, a weed guard wire extending outwardly from one end of said body, a flexible shaft of greater flexibility than that of said weed guard wire securely anchored to and extending from the same end of said body and in the same general direction as said weed guard wire, and a rigid fish hook having a shaft attached to the free end of said flexible shaft and in general alinement therewith, said flexible shaft permitting free movement of the hook in all lateral directions and forming the sole support for holding the hook in operative position, substantially in alinement with said body.

2. In a weedless fishing lure, a body resembling the head of a minnow, a weed guard wire extending from one end of said body, a flexible shaft of greater flexibility than that of said weed guard wire securely anchored to and extending from the same end of said body and in the same general direction as said weed guard wire, and a rigid fish hook having a shaft attached to the free end of said flexible shaft and in general alinement therewith, said flexible shaft permitting free movement of the hook in all lateral directions and forming the sole support for holding the hook in operative position, substantially in alinement with said body.

3. In a weedless fishing lure, a body resembling the head of a minnow, a weed guard wire extending from one end of said body and having a curved outer end, a flexible shaft of greater flexibility than that of said weed guard wire securely anchored to and extending from the same end of said body and in the same general direction as said weed guard wire, and a rigid fish hook having a shaft attached to the free end of said flexible shaft and in general alinement therewith, said flexible shaft forming the sole support for holding the hook in operative position, substantially in alinement with said body, said hook having a curved and pointed hook portion arranged to be positioned freely movable within the curved portion of said curved outer end of said weed guard wire.

4. In a weedless fishing lure, a body resembling the head of a minnow, a weed guard wire extending from one end of said body, a flexible shaft of greater flexibility than that of said weed guard wire securely anchored to and extending from the same end of said body and in the same general direction as said weed guard wire, a rigid fish hook having a shaft attached to the free end of said flexible shaft and in general alinement therewith, said flexible shaft permitting free movement of the hook in all lateral directions and forming the sole support for holding the hook in operative position, substantially in alinement with said body, and a spoon attached pivotally to the free end of said weed guard wire.

5. A fishing lure according to claim 4, in which said body is provided with a neck portion, said weed guard wire and said flexible shaft extending outwardly from said neck portion, and a skirt comprising a buck tail attached to said neck portion and covering said weed guard wire, said flexible shaft and said fish hook.

References Cited in the file of this patent

UNITED STATES PATENTS

| | | |
|---|---|---|
| D. 169,303 | Dawson | Apr. 14, 1953 |
| 673,087 | Rabbeth | Apr. 30, 1901 |
| 1,178,861 | Kruschke | Apr. 11, 1916 |
| 1,295,617 | Shannon | Feb. 25, 1919 |
| 1,529,615 | Charpentier | Mar. 10, 1925 |
| 2,007,045 | Francis | July 2, 1935 |

FOREIGN PATENTS

| | | |
|---|---|---|
| 445,272 | Italy | Feb. 10, 1949 |